3,419,380
TRICYCLIC KETALS AS HERBICIDES
Paul E. Hoch, Youngstown, and George B. Stratton, Lewiston, N.Y., assignors to Hooker Chemical Corporation, Niagara Falls, N.Y., a corporation of New York
No Drawing. Continuation-in-part of application Ser. No. 413,947, Nov. 25, 1964. This application Nov. 26, 1965, Ser. No. 510,025
11 Claims. (Cl. 71—88)

ABSTRACT OF THE DISCLOSURE

A method for controlling plant growth, utilizing a tricyclic ketal of the formula

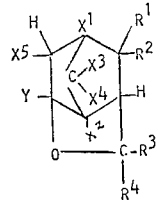

in which the X's are hydrogen, halogen or an organic radical; Y is a nucleophilic radical; and the R's represent an organic radical.

---

This is a continuation-in-part of copending application Ser. No. 413,947, filed Nov. 25, 1964, now U.S. Patent No. 3,346,596, which is a continuation-in-part of application Ser. No. 327,519, filed Dec. 2, 1963, now U.S. Patent No. 3,331,860.

This invention relates to the methods for utilizing certain tricyclic ketals in the control of pests, the regulation of plant growth, and other biological methods. The invention relates to compounds having the formula

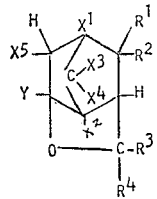

wherein $X^1$ and $X^2$ are independently selected from the group consisting of hydrogen, halogen, alkyl, alkenyl, halogenated alkyl and halogenated alkenyl;

$X^3$ and $X^4$ are independently selected from the group consisting of hydrogen, halogen, alkoxy, alkyl, alkenyl, halogenated alkyl, and halogenated alkenyl, at least two of $X^1$, $X^2$, $X^3$ and $X^4$ being halogen;

$X^5$ is selected from the group consisting of hydrogen, halogen and alkoxy;

Y is a nucleophilic radical;

$R^1$ and $R^2$ are independently selected from the group consisting of hydrogen, hydrocarbyl, halogen-substituted hydrocarbyl, and carboxyl;

$R^3$ and $R^4$ are independently selected from the group consisting of hydrogen, hydrocarbyl, halogen-substituted hydrocarbyl, hydroxy-substituted alkyl, alkoxy-substituted alkyl, and hydroxy-substituted alkoxyalkyl; and $R^1$ and $R^3$ are cycloalkyl when $R^1$ and $R^3$ join to form a ring; provided that at least one of $R^1$ and $R^2$ can be hydroxy-substituted alkyl when Y is one of halogen, hydroxy, hydrocarbyloxy, mercapto, substituted hydrocarbyloxy and substituted hydrocarbyl mercapto.

The hydrocarbyl radicals are monovalent radicals derivable from a hydrocarbon by the removal of one hydrogen atom. Typical hydrocarbyl radicals are alkyl, alkenyl, alkynyl, alkadienyl, aryl, cycloalkyl and the like, defined with greater particularly herein.

Illustrative examples of the alkyl substituents, which usually contain from 1 to about 18 carbon atoms, and preferably from 1 to about 6 carbon atoms, are methyl, ethyl, propyl, isopropyl, butyl, isobutyl, amyl hexyl, cyclohexyl, heptyl, octyl, nonyl, dodecyl, pentadecyl, stearyl, octadecyl, and the like, said alkyl group being a monovalent radical derivable from an aliphatic hydrocarbon by the removal of one hydrogen atom. The alkylene radicals can be similarly described, except that they are divalent radicals derivable from an aliphatic hydrocarbon by the removal of two hydrogen atoms, such as methylene; ethylene and the like. The alkyl radical can be substituted by halogen, such as chlorine, bromine, or fluorine, as in chloromethyl, dichloromethyl, trichloromethyl, trifluoromethyl, bromoethyl, chloroethyl, fluoropropyl, hexachloroisopropyl, chlorobutyl, bromobutyl, chlorocyclohexyl, chloropropyl, bromooctyl, chlorooctyl, chlorodecyl, chlorododecyl, bromododecyl, bromopentadecyl, and the like.

Among the alkenyl, alkynyl and alkadienyl substituents which usually contain from 1 to about 18 carbon atoms, and preferably from 1 to about 6 carbon atoms, are vinyl, ethynyl, allyl, propynyl, butenyl, butadienyl, methyl butadienyl, hexenyl, octenyl, dodecenyl, and the like said alkenyl group being a radical derivable from an alkene by the removal of one hydrogen atom. The alkenyl radical can be substituted by halogen, such as chlorine, bromine or fluorine, as in trichlorovinyl, 2-chloroallyl, 2,3-difluorobutenyl, 2,3-dichlorododecenyl, 2-bromoallyl, and the like.

Typical aryl substitutents, including aralkyl and alkaryl groups, which usually contain from 6 to about 10 carbon atoms, are phenyl, benzyl, tolyl, phenylethyl, xylyl, naphthyl, hexylphenyl, and the like, said aryl group being a monovalent radical derivable from an aromatic hydrocarbon by the removal of one hydrogen atom. The aryl radicals can be substituted by halogen, such as chlorine, bromine and fluorine, as in p-chlorophenyl, p-bromophenyl, p-fluorophenyl and the like.

Typical cycloalkyl substituents, which usually contain from three to about twelve carbon atoms, are cyclohexyl, cyclopropyl, cyclopentyl, cycloheptyl, cyclooctyl, and the like, said cycloalkyl group being a monovalent radical derivabe from an alicyclic hydrocarbon by the removal of one hydrogen atom. The cycloalkyl radicals can be substituted by halogen, e.g., chlorine, bromine and fluorine, as in chlorocyclohexyl, bromocyclopentyl, fluorocyclohexyl, and the like.

The substituting halogen atoms which are useful include chlorine, bromine and fluorine. The halogenated alkyl, aryl, cycloalkyl or alkenyl radicals can bear from one up to a number, corresponding to perhaogenation, i.e., all hydrogens replaced with halogen atoms.

Typical nucleophilic radicals, as the term is employed herein, are halogen, hydroxy, hydrocarbyloxy, mercapto, cyano, thiocyano, carboxy, azido, hydrocarbylmercapto, hydroxy-substituted hydrocarbyloxy, hydroxy-substituted hydrocarbylmercapto, mercapto-substituted hydrocarbyloxy, mercapto-substituted hydrocarbylmercapto, hydrocarbyloxy-substituted hydrocarbyloxy, hydrocarbyloxy-substituted hydrocarbylmercapto, hydrocarbylthiohydrocarbylmercapto, and hydrocarbylthiohydrocarbyloxy, wherein the hydrocarbyl groups are as defined hereinbefore, and can be halogen-substituted, as desired.

The preferred compounds of the invention are those wherein the halogen substitutents are chlorine or bromine, in which $R^1$ and $R^3$ are hydrogen, $R^2$ is selected from hydrogen, chloro-substituted lower alkyl, hydroxy-substituted lower alkyl, and carboxy; and $R^4$ is selected from hydrogen, chloro-substituted lower alkyl and lower alkoxy-substituted lower alkyl. Even more preferred are such compounds wherein the halogen is chlorine. The preferred nucleophilic radicals are chlorine, alkoxy, aryloxy, hydroxy, cyano, carboxy and hydroxy-substituted alkoxy. Lower alkyl radicals have one to six carbon atoms.

The compounds of the invention are prepared in a series of reactions starting with selected bicyclic alcohols as disclosed in application Ser. No. 413,947. These alcohols are prepared by reacting the appropriate substituted cyclopentadiene and unsaturated alcohol as represented by the following equation.

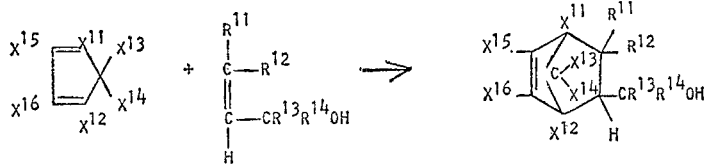

wherein $X^{11}$ and $X^{12}$ are independently selected from the group consisting of hydrogen, halogen, alkyl and alkenyl;

$X^{13}$ and $X^{14}$ are independently selected from the group consisting of hydrogen, halogen, alkoxy, alkyl, and alkenyl, at least two of $X^{11}$, $X^{12}$, $X^{13}$ and $X^{14}$ being halogen;

$X^{15}$ and $X^{16}$ are independently selected from the group consisting of hydrogen, halogen and alkoxy, at least one of $X^{15}$ and $X^{16}$ being halogen;

$R^{11}$ and $R^{12}$ are independently selected from the group consisting of hydrogen, hydrocarbyl, and hydroxy-substituted alkyl;

$R^{13}$ and $R^{14}$ are independently selected from the group consisting of hydrogen, hydrocarbyl, hydroxy-substituted alkyl, alkoxy-substituted alkyl and hydroxy-substituted alkoxyalkyl, and $R^{11}$ and $R^{13}$ can join to form a cycloalkyl group, generally of 5 to 6 carbon atoms.

The halogen, hydrocarbyl, alkyl, and alkenyl radicals are the same as those described hereinbefore. The preparation of such alcohols is described in detail in U.S. Patent 3,007,958. Suitable cyclopentadiene include, for example, 1,2,3,4,5,5-hexachlorocyclopentadiene;
1,2,3,4,5-pentachlorocyclopentadiene;
1,2,4,5,5-pentachlorocyclopentadiene;
tetrachlorocyclopentadiene;
1,2,3,4-tetrachloro-5,5-dibromocyclopentadiene;
1,2,3,4-tetrachloro-5,5-difluorocyclopentadiene;
1,2,3,4-tetrachloro-5,5-dimethoxycyclopentadiene;
1,3,4-trichloro-2,5,5-trimethoxycyclopentadiene;
trichloromethylpentachlorocyclopentadiene;
trichlorovinylpentachlorocyclopentadiene;
butenylpentachlorocyclopentadiene;

and the like. The usual halogen substitutents are chlorine, fluorine, bromine and mixtures thereof, preferably chlorine. Suitable alcohols are, for example, 2-butenyl alcohol; cinnamyl alcohol; 1-carboxy-3-hydroxy propene-1; 2-butene-1,4-diol; 3-hexene-2,5-diol; 8-hexadecene-7,10-diol; 1,4-cyclohexyl-2-butene-1,4-diol; 3,4-dihydroxy-2-butene; 3-hydroxycyclopentene-1; 3-hydroxycyclohexene-1 and the like. Compounds that are readily convertible to alcohols in the reaction process are also useful, such as 3,4-epoxy-1-butene and 3,4-epoxy-1-hexane.

The preparation of the compounds of the invention is illustrated in the following equations wherein the reaction steps are designated by the letters "A" through "H," but is not intended to be limited thereby.

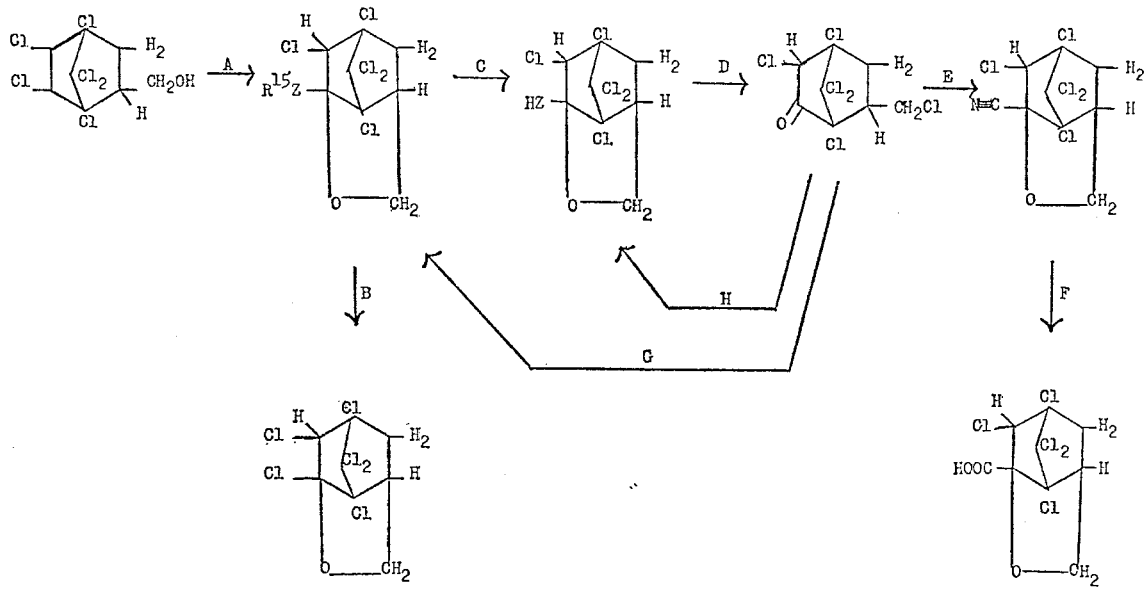

The preparation of the compounds of the invention is further illustrated in the following examples which shows the preparation of specific compounds. All parts are by weight, all analyses are given in percentages by weight, and temperatures are given in degrees centigrade, unless indicated otherwise, in all the succeeding examples.

Example 1.—Preparation of 4-ethoxy-5,6,7,7,8-pentachloro-3-oxatricyclo[4.2.1.0$^{4,8}$]nonane (Reaction A)

A solution of sodium ethoxide was prepared by adding 92 parts of sodium metal to 3,925 parts of absolute ethanol. To this solution was added, with stirring at 74 degrees centigrade, a solution of 331 parts of 1,4,5,6,7,7,-hexachloro-2-hydroxymethylbicyclo(2.2.1) - 5-heptene in 785 parts of absolute ethanol. Addition was made portionwise over one hour. The suspension was stirred at reflux for two hours after addition of the reactants was completed. Four thousand parts of water were added to the reaction at completion, and the pH was adjusted with hydrochloric acid to 7.0. The solid that precipitated was collected on a filter, washed several times with water and dried under vacuum at 50 degrees centigrade overnight to a constant weight of 332 parts. Recrystallization from n-heptane and a treatment with activated charcoal yielded 325 parts of product, having a melting point of 110 to 111.5 degrees centigrade. Product analysis was:

Calculated for $C_{10}H_{11}O_2Cl_5$: Cl, 52.1; C, 35.3; H, 3.24. Found: Cl, 52.0; C, 35.4; H, 3.36.

4 - methoxy - 5,6,7,7,8 - pentachloro - 3 - oxatricyclo-[4.2.1.0$^{4,8}$]nonane is prepared in the same manner using methanol in place of ethanol.

Example 2.—Preparation of 4-(2',4'-dichlorophenoxy)-5,6,7,7,8 - pentachloro-3-oxatricyclo[4.2.1.0$^{4,8}$]nonane (Reaction A)

A solution of sodium alcoholate, prepared from 9.2 parts of sodium metal and 157 parts of ethanol, was treated with 65.5 parts of 2,4-dichlorophenol. To this solution at reflux, 32.1 parts of 1,4,5,6,7,7-hexachloro-2-hydroxymethylbicyclo(2.2.1)-5-heptene in 78.5 parts by weight of ethanol was added portionwise over 0.5 hour. The suspension was stirred at reflux for 3.0 hours. The reaction mixture was evaporated to one-third of its volume and the residue added to a large excess of water. The oil that separated, crystallized on standing to yield 32 parts of solid which recrystallized from hexane to yield 15 parts of solid product melting at 109 to 129 degrees centigrade. The solid was treated wtih dilute aqueous caustic, then recrystallized from heptane to yield a solid having a melting point of 136 to 138 degrees centigrade. The product analysis was:

Calculated for $C_{14}H_9Cl_7O_2$: C, 36.76; H, 1.98; Cl, 54.26. Found: C, 37.00; H, 2.0; Cl, 54.7.

Example 3.—Preparation of 4-ethylmercapto-5,6,7,7,8-pentachloro-3-oxatricyclo[4.2.1.0$^{4,8}$]nonane (Reaction A)

Into 78.5 parts by weight of ethanol were slowly mixed 4.6 parts of sodium metal in a reaction vessel. Then, 12.4 parts of ethyl mercaptan were added to the vessel, and thereafter 16.5 parts of 1,4,5,6,7,7-hexachloro-2-hydroxymethylbicyclo(2.2.1)-5-heptene dissolved in 78.5 parts by weight of ethanol were added over a period of ten minutes at 69 degrees centigrade. The reaction mixture was refluxed at 80 degrees centigrade for two hours. Then, the reaction mixture was cooled, water was added, and the product was acidified with hydrochloric acid to neutralize it. The resulting mixture was extracted three times with diethyl ether, and was distilled to remove the solvent. The resulting brown oil product (17.8 parts by weight) was fractionated. The fraction boiling at 138 to 144 degrees centigrade and 0.2 mm. was a yellow oil (8 parts) having the following analysis:

Calculated for $C_{10}H_{11}Cl_5SO$: C, 33.69; H, 3.11; Cl, 49.8; S, 8.98. Found: C, 33.61; H, 3.05; Cl, 49.9; S, 9.13.

Suitable alcohols or like media for use in forming an alkoxide, or as the alcoholic medium for Reaction A, are those having the formula $R^{15}ZH$, wherein Z is selected from the group consisting of oxygen and sulfur, and $R^{15}$ is selected from the group consisting of hydrocarbyl, halogen-substituted aryl, hydroxy-substituted hydrocarbyl, mercapto-substituted hydrocarbyl, hydrocarbyloxy-substituted hydrocarbyl, and hydrocarbylthio-substituted hydrocarbyl. The hydrocarbyl, and halogen-substituted aryl groups are the same as those described hereinbefore in connection with $R^1$, $R^2$, $R^3$, and $R^4$.

The products of Reaction A can be reacted with halogens and halogen halides to produce compounds wherein the hydrocarbyl, e.g., alkyl, cycloalkyl, alkenyl and aryl substituents as represented by $X^{11}$, $X^{12}$, $X^{13}$, $X^{14}$, $R^{11}$, $R^{12}$, $R^{13}$, $R^{14}$ and $R^{15}$ are converted to the corresponding halogen-substituted radicals as represented by $X^1$, $X^2$, $X^3$, $X^4$, $R^1$, $R^2$, $R^3$, $R^4$ and $R^5$, respectively, $R^5$ represents the same radicals as $R^{15}$ and, in addition, halogen-substituted alkyl and halogen-substituted cycloalkyl. The halogen-substituted alkyl, alkenyl, cycloalkyl and aryl radicals are as described hereinbefore.

Example 4.—Preparation of 4,5,6,7,7,8-hexachloro-3-oxatricyclo[4.2.1.0$^{4,8}$]nonane (Reaction B)

10 parts of 4-methoxy-5,6,7,7,8-pentachloro-3-oxatricyclo[4.2.1.0$^{4,8}$]nonane were mixed with 158.4 parts by weight of carbon tetrachloride. Gaseous chlorine was introduced into the reaction mixture in the presence of a mercury vapor light at a temperature of 78 to 80 degrees centigrade for 0.66 hour. When 34 milliequivalents of chloride ion had been collected overhead from the reaction mixture, a sample of the product was removed from the reactor, the solvent was evaporated and the resulting colorless syrup was found to have a chlorine content of 58.4 percent. The remainder of the reaction mixture was chlorinated further until 0.0145 mole of chlorine ion had been added. The resulting product was evaporated to remove the solvent, thus producing a light brown cloudy syrup. Infrared analysis showed that the product was free of carbonyl group. The product contained 68.5 percent chlorine. The chlorine content of the desired product is calculated to be 68.4 percent.

Example 5.—Preparation of 4-hydroxy-5,6,7,7,8-pentachloro-3-oxatricyclo[4.2.1.0$^{4,8}$]nonane (Reaction C)

A suspension of 30 parts of 4-ethoxy-5,6,7,7,8-pentachloro-3-oxatricyclo[4.2.1.0$^{4,8}$]nonane in 92 parts by weight of concentrated sulfuric acid was warmed to 88 to 100 degrees centigrade with stirring and was held for 0.75 hour. The hot acid solution was poured into 700 parts of ice and water, and the resulting suspension was warmed to 80 degrees centigrade, then cooled and filtered. Then, 13 parts of solid product were recrystallized from benzene several times to yield 7 parts of white crystals having a melting point of 231 to 232 degrees centigrade. Infrared analysis of the product indicated the presence of hydroxyl group, absence of carbonyl group. Elemental analysis showed:

Calculated for $C_8H_7Cl_5O_2$: C, 30.75; H, 2.24; Cl, 56.70. Found: C, 30.96; H, 2.20; Cl, 56.90.

Using the method of Example 5, the compound 9-chloromethyl - 4 - hydroxy - 5,6,7,7,8 - pentachloro - 3 - oxatricyclo[4.2.1.0$^{4,8}$]nonane is prepared from 9-chloromethyl - 4 - ethoxy - 5,6,7,7,8 - pentachloro - 3 - oxatricyclo[4.2.1.0$^{4,8}$]nonane. The latter compound is prepared by reacting 4-ethoxy - 9 - hydroxymethyl-5,6,7,7,8-pentachloro-3-oxatricyclo[4.2.1.0$^{4,8}$]nonane with phosphorus pentachloride at elevated temperature until hydrogen chloride evolution ceases. The 9-hydroxymethyl derivative is prepared from 1,4,5,6,7,7-hexachloro - 2,3 - di(hydroxymethyl)bicyclo(2.2.1)-5-heptene by the method of Example 1.

Example 6.—Preparation of 2-keto-5,6-bis(chloromethyl) - 1,3,4,7,7 - pentachlorobicyclo(2.2.1)heptane (Reaction D)

A mixture of 100 parts of 9-chloromethyl-4-hydroxy-5,6,7,7,8 - pentachloro - 3 - oxatricyclo[4.2.1.0$^{4,8}$]nonane and 74 parts of phosphorus pentachloride was heated slowly to the reflux temperature. An exothermic reaction took place, accompanied by evolution of hydrogen chloride. The reaction mixture was refluxed at 136 degrees centigrade for 1.5 hours. The resulting reaction product was poured into water and washed thoroughly and then extracted with hexane. The reaction product was dried in contact with magnesium sulfate and then the hexane solvent was distilled off. The product distilled at a temperature of 140 to 144 degrees centigrade and 1 mm. mercury. Infrared analysis of the product indicated the presence of the carbonyl group. Chemical analysis gave the following results:

Calculated for $C_9H_7Cl_7O$: C, 28.57; H, 1.60; Cl, 65.6. Found: C, 28.32; H, 1.66; Cl, 68.2.

Example 7.—Preparation of 4-cyano-5,6,7,7,8-pentachloro-3-oxatricyclo[4.2.1.0$^{4,8}$]nonane (Reaction E)

A solution containing 132 parts of 2-keto-5,6-bis(chloromethyl) - 1,3,4,7,7 - pentachlorobicyclo(2.2.1)heptane in 785 parts by weight of ethanol and 30 parts by weight of water was treated with 52 parts of potassium cyanide. The solution was stirred at reflux for 2.0 hours. The resulting dark suspension was acidified with dilute sulfuric acid and then evaporated to near dryness. The residue was poured into water and the brown solid collected on a filter. The solid was dissolved in hexane, dried over magnesium sulfate (anhydrous), and filtered. The excess hexane was removed, and crystals separated upon chilling the solution. Sixty parts of product were recovered having a melting point of 226 to 231 degrees centigrade. Recrystallization raised the melting point to 235 to 236 degrees centigrade.

Elemental analysis of the product gave the following results:

Calculated for $C_9H_6ONCl_5$: C, 33.63; H, 1.88; N, 4.36; Cl, 55.16. Found: C, 33.7; H, 2.02; N, 4.28; Cl, 54.98.

Example 8.—Preparation of 4-carboxy-5,6,7,7,8-pentachloro-3-oxatricyclo-[4.2.1.0$^{4,8}$]nonane (Reaction F)

To a mixture of 552 parts by weight of sulfuric acid, 100 parts by weight of water and 1,050 parts by weight of glacial acetic acid were added 80 parts of 4-cyano-5,6,7,7,8-pentachloro-3-oxatricyclo[4.2.1.0$^{4,8}$]nonane. The mixture was stirred and heated to 127 degrees centigrade at which temperature slight refluxing occurred. Refluxing was continued for 14 hours, and the reaction mixture was added to 5,000 parts by weight of water. The solid product was filtered from the mixture, washed with water and dried. The resulting product was 60 parts of white solid having a melting point of 279 to 281 degrees centigrade. The product had a chlorine content of 51.8 percent. The calculated chlorine content for $C_9H_6Cl_5NO$ is 52.1 percent. The acid number of the product corresponded closely to the theoretical value:

Calculated neutralization equivalent: 340. Found: 339.

Examples 9 to 11.—Fungicidal activity

Finely divided aqueous dispersion of various compounds of the invention were prepared by dissolving them in a minimum quantity of acetone and pouring the solutions into water with vigorous agitation, to obtain dispersions containing 400 parts of the chemical per million parts of water (i.e., 0.04 percent). These dispersions were quickly sprayed onto tomato plants which had been inoculated with spores of Alternaria solani, the causative organism of early blight disease of tomatoes. Three days later, when similarly inoculated but unsprayed plants were severely diseased, as shown by leaf necrosis, the treated plants showed the following degree of disease control:

| Example | Compound | Disease Rating* |
|---------|----------|-----------------|
| 9 | 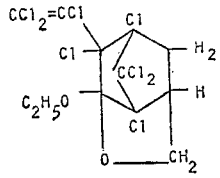 | 2 |
| 10 | 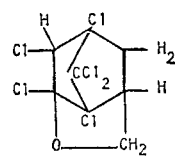 | 3 |
| 11 | 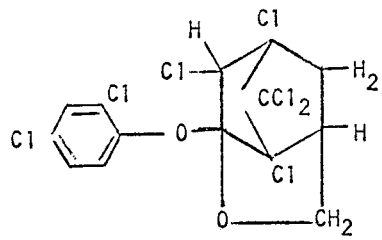 | 2 |

*Scale: 0=no control; 1=slight control; 2=substantial, economically useful control; 3=essentially complete control of leaf necrosis.

Example 12.—Bacteriostatic activity

The incorporation of 255 parts per million of the compound of the formula

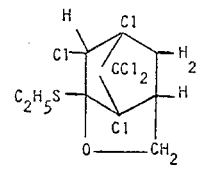

into nutrient agar which was then inoculated with *Staphylococcus aureus*, strongly retarded growth of the bacterial colonies on the agar.

Example 13.—Herbicidal activity

The application of four pounds per acre of the compound of the formula

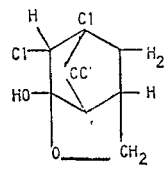

in finely divided form onto a healthy stand of millet resulted in 80 percent kill of the millet within one week.

Example 14.—Miticidal activity

Bean plants heavily infested with red spider mites were sprayed with an aqueous dispersion of the compound of the formula

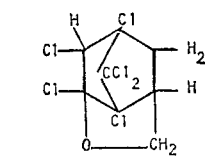

at the rate of 1,000 parts of the compound per million parts of water. Within 48 hours, essentially all of the mites were dead.

Example 15.—Insecticidal activity

The compound of the formula was dispersed in finely divided state in water at concentrations of 500 and 1,000 parts of compound per million parts of water. The suspension was sprayed onto the leaves of bean plants. After the water evaporated, the larvae of Southern Army Worm was applied to the leaves. The leaves were observed 24 hours later, and it was found that 100 percent kill had resulted.

Example 16.—Plant growth regulation

The compound of the formula

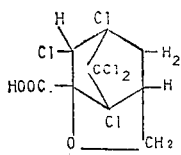

was applied at a rate of 8 pounds of compound per acre to soil in which beans had been planted, but prior to emergence of the bean plants. Another plot of soil in which beans had been planted at the same time as in the test plot was left untreated. After a period of two weeks, the bean plants in the untreated soil had grown to normal size. In contrast, the plants in the test plot were extremely stunted, but no other malformation or toxic effect was observed.

In the foregoing manner, the utility of the compound of the invention was demonstrated as a plant growth regulator. This property is important in the cultivation of ornamental plants, as well as in cultivation of fruit trees where it is desirable to retard the tree growth. The cultivation of shorter fruit trees also facilitates the picking of the crop.

In the foregoing examples, the components have been named in accordance with the system of nomenclature employed by Chemical Abstracts, and with the provision that the compounds have the following structural formula

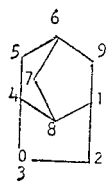

wherein the numerals indicate the position of substituents attached to the tricyclic nucleus. Thus, the compound prepared in Example 1 has been named 4-ethoxy-5,6,7,7,8-pentachloro-3-oxatricyclo[4.2.1.0$^{4,8}$]nonane. Attachment of the oxygen to a different position on the initial bicyclic structure to provide the following structural formula

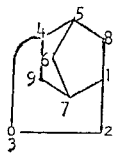

requires renumbering some of the positions of the tricyclic structure, as indicated by the numerals. Under these circumstances, the compound produced in Example 1 is named 4-ethoxy-5,6,6,7,9 - pentachloro-3-oxatricyclo[3.2.1$^{4,7}$]nonane.

As shown in the preceding examples, the compounds of the invention are useful in a variety of applications requiring biological activity. Such activity includes utility as fungicides, insecticides, bactericides, herbicides, and as plant growth regulators.

When compounds of the invention are utilized in controlling bacteria, the compound is brought into contact with the bacteria to be controlled in an amount sufficient to provide the desired control of the bacteria, e.g., a bactericidal amount. Typically, the compound is applied at a rate within the range of about 5 to 25 grams per square meter of the surface to be treated. However, either greater or lesser application rates can be used depending on the conditions that exist and the extent of control required. The compound of the invention can be applied to the area in which bacteria is to be controlled as an aqueous suspension or solution containing the compound in an amount in the range of 5 to about 50 percent by weight of the aqueous composition.

The herbicidal compounds of the invention can be used alone or as part of liquid or solid formulations of various types. Thus, the compounds can be formulated as liquids by diluting, dispersing, dissolving or emulsifying with a surface active adjuvant in organic solvents such as petroleum hydrocarbons, alcohols, ketones, esters, and the like. The compounds can be made into solid formulations of powders, dusts, wettable dusts, granules and pellets, using solid diluents such as talc, clay, flour, starch, mica, limes, carbonates and phosphates. Generally, the proportions of either the solvent medium or solid carrier to herbicidally active material is in the range of 1:1 to 1,000:1, preferably 3:1 to 200:1. Rates of application vary according to the degrees of resistance of the plants to be controlled, the soil type and climatic conditions, but, in general, the rates of application are at least one quarter of a pound of herbicides per acre up to 400 pounds per acre, preferably 0.5 to 50 pounds per acre, but in any event, in an amount sufficient to provide the desired control, e.g., a herbicidal amount.

When desired for plant growth regulation, the compounds of the invention are similarly formulated as liquid or solid formulations. However, the compounds are used in an amount to provide the desired amount of growth regulation.

When compounds of the invention are utilized in the control of insects and other invertebrate pests, including mites, and many others, the compound is brought into contact with the pest to be controlled in an amount sufficient to provide the desired control, e.g., a pesticidal amount, or an insecticidal amount, and the like. Effective insecticidal concentrations are in the range from about 0.01 pound per acre to about 20 pounds per acre. In most crop applications, rates of 0.05 to 5 pounds per acre are employed. Lower rates are used on very susceptible species, while higher rates are used on extremely resistant species. The insecticidal compounds can be used in combination with a class of potentiators or synergists known in the insecticidal art as "knockdown agents." Other adjuvants useful with the compounds of the invention include odorants, colorants, stabilizers, and extending agents. The composition can be formulated as solids or liquids using solid or liquid solvent vehicles, carriers or extenders. The compounds can also be combined with other pesticidally active compounds.

When compounds of the invention are applied as fungicides, the compound is employed in an amount sufficient to provide the desired control of the fungus, e.g., a fungicidal amount. The compounds are generally used at rates ranging from 0.05 to 100 pounds per acre. Very low rates, 0.05 to 1 pound per acre are sufficient when the compounds are utilized as seed treatment chemicals. Higher rates, 0.1 to 20 pounds per acre, are used when a crop is treated in the field, such as in the application of sprays, dusts and granules. Rates up to 100 pounds per acre are utilized when it is necessary to treat an entire mass of soil to a considerable depth in heavily infested fields.

The compounds can be used with other active agents such as insecticides, herbicides, fertilizers, plant growth regulators, and other fungicides. The compounds can be used in the pure state or with suitable adjuvants, such as solvents, solid carriers, surfactants, synergists, colorants and odorants.

While this invention has been described with reference to certain specific embodiments, it will be recognized by those skilled in the art that many variations are possible

What is claimed is:

1. A method for the control of plant growth, comprising applying to the locus to be treated a herbicidal amount of a compound of the formula

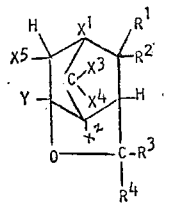

wherein $X^1$ and $X^2$ are independently selected from the group consisting of hydrogen, halogen, alkyl, alkenyl, halogenated alkyl and halogenated alkenyl;

$X^3$ and $X^4$ are independently selected from the group consisting of hydrogen, halogen, alkoxy, alkyl, alkenyl, halogenated alkyl, and halogenated alkenyl, at least two of $X^1$, $X^2$, $X^3$ and $X^4$ being halogen;

$X^5$ is selected from the group consisting of hydrogen, halogen and alkoxy;

Y is a nucleophilic radical;

$R^1$ and $R^2$ are independently selected from the group consisting of hydrogen, hydrocarbyl, halogen-substituted hydrocarbyl, and carboxy;

$R^3$ and $R^4$ are independently selected from the group consisting of hydrogen, hydrocarbyl, halogen-substituted hydrocarbyl, hydroxy-substituted alkyl, alkoxy-stituted alkyl, and hydroxy-substituted alkoxyalkyl; and $R^1$ and $R^3$ are cycloalkyl when $R^1$ and $R^3$ join to form a ring; provided that at least one of $R^1$ and $R^2$ can be hydroxy-substituted alkyl when Y is one of halogen, hydroxy, hydrocarbyloxy, mercapto, substituted hydrocarbyloxy and substituted hydrocarbylmercapto; wherein alkyl has 1 to 18 carbon atoms, alkenyl has 1 to 18 carbon atoms, alkoxy has 1 to 18 carbon atoms, hydrocarbyl has 1 to 18 carbon atoms, cycloalkyl has 3 to 12 carbon atoms, hydrocarbyloxy has 1 to 18 carbon atoms, hydrocarbylmercapto has 1 to 18 carbon atoms and hydrocarbylthio has 1 to 18 carbon atoms.

2. The process of claim 1, wherein:
  (a) $X^1$, $X^2$, $X^3$, $X^4$, and $X^5$, are chlorine;
  (b) Y is a nucleophilic radical of the formula $R^5Z$ wherein:
     (1) Z is selected from the group consisting of oxygen and sulfur; and
     (2) $R^5$ is selected from the group consisting of hydrocarbyl, halogen-substituted hydrocarbyl, hydroxy-substituted hydrocarbyl, mercapto-substituted hydrocarbyl, hydrocarbyloxy - substituted hydrocarbyl, and hydrocarbylthio-substituted hydrocarbyl; wherein alkyl has 1 to 18 carbon atoms, alkoxy has 1 to 18 carbon atoms, hydrocarbyl has 1 to 18 carbon atoms, cycloalkyl has 3 to 12 carbon atoms, hydrocarbyloxy has 1 to 18 carbon atoms and hydrocarbylthio has 1 to 18 carbon atoms.

3. The process of claim 2, wherein $R^5$ is hydrogen.

4. The process of claim 1, wherein:
  (a) $X^1$, $X^2$, $X^3$, $X^4$, and $X^5$ are chlorine; and
  (b) Y is chlorine.

5. The process of claim 1, wherein:
  (a) $X^1$, $X^2$, $X^3$, $X^4$, and $X^5$ are chlorine; and
  (b) Y is $-C\equiv N$.

6. The process of claim 1, wherein:
  (a) $X^1$, $X^2$, $X^3$, $X^4$, and $X^5$, are chlorine; and
  (b) Y is $-COOH$.

7. The process of claim 1, wherein:
  (a) $X^1$, $X^2$, $X^3$, $X^4$, and $X^5$, are chlorine; and
  (b) $R^1$, $R^2$, $R^3$, and $R^4$ are hydrogen; and
  (c) Y is ethylmercapto.

8. The process of claim 1, wherein:
  (a) $X^1$, $X^2$, $X^3$, $X^4$, and $X^5$, are chorine; and
  (b) $R^1$, $R^2$, $R^3$, and $R^4$ are hydrogen; and
  (c) Y is chloro.

9. The process of claim 1, wherein:
  (a) $X^1$, $X^2$, $X^3$, $X^4$, and $X^5$, are chlorine; and
  (b) $R^1$, $R^2$, $R^3$, and $R^4$ are hydrogen; and
  (c) Y is hydroxy.

10. The process of claim 1, wherein:
  (a) $X^1$, $X^2$, $X^3$, $X^4$, and $X^5$, are chlorine; and
  (b) $R^1$, $R^2$, $R^3$, and $R^4$ are hydrogen; and
  (c) Y is carboxy.

11. The process of claim 1, wherein:
  (a) $X^1$, $X^2$, $X^3$, $X^4$, and $X^5$, are chlorine; and
  (b) $R^1$, $R^2$, $R^3$, and $R^4$ are hydrogen; and
  (c) Y is 2',4'-dichorophenoxy.

References Cited

UNITED STATES PATENTS

| | | | |
|---|---|---|---|
| 2,841,485 | 7/1958 | Johnson et al. | 71—2.5 XR |
| 2,983,732 | 5/1961 | Geering et al. | 71—2.5 XR |
| 3,038,794 | 6/1962 | Geary et al. | 71—2.5 |
| 3,298,815 | 1/1967 | Mark | 71—2.5 |

LEWIS GOTTS, *Primary Examiner.*

G. HOLLRAH, *Assistant Examiner.*

U.S. Cl. X.R.

71—76; 167—33

PO-1050
(5/69)

UNITED STATES PATENT OFFICE
CERTIFICATE OF CORRECTION

Patent No. 3,419,380          Dated December 31, 1968

Inventor(s) Paul E. Hoch and George B. Stratton

It is certified that error appears in the above-identified patent and that said Letters Patent are hereby corrected as shown below:

Column 2, line 5, after "greater" the word should be corrected to read as---particularity---.
Column 2, line 58, the word after the second occurrance of "to" should be corrected to read as---perhalogenation---.
Column 8, line 35, the formula should be corrected to read as

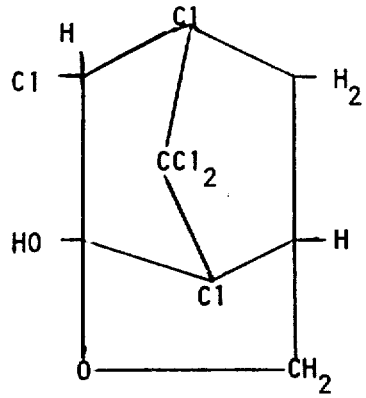

SIGNED AND
SEALED
FEB 24 1970

(SEAL)
Attest:

Edward M. Fletcher, Jr.
Attesting Officer

WILLIAM E. SCHUYLER, JR.
Commissioner of Patents